US010106209B2

(12) United States Patent
Jaworski et al.

(10) Patent No.: US 10,106,209 B2
(45) Date of Patent: Oct. 23, 2018

(54) RAIL ASSEMBLIES FOR TRAILERS

(71) Applicant: Hyundai Translead, San Diego, CA (US)

(72) Inventors: Leszek Jaworski, San Diego, CA (US); Alvaro Frausto, San Diego, CA (US); Humberto Benitez, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 13 days.

(21) Appl. No.: 15/291,974

(22) Filed: Oct. 12, 2016

(65) Prior Publication Data

US 2018/0001939 A1 Jan. 4, 2018

Related U.S. Application Data

(60) Provisional application No. 62/357,801, filed on Jul. 1, 2016.

(51) Int. Cl.
*B62D 25/06* (2006.01)
*B62D 33/04* (2006.01)

(52) U.S. Cl.
CPC ............. *B62D 33/04* (2013.01); *B62D 25/06* (2013.01)

(58) Field of Classification Search
CPC .................................. B62D 33/04; B62D 25/06
See application file for complete search history.

(56) References Cited

U.S. PATENT DOCUMENTS

| 8,177,289 | B2 * | 5/2012 | Haire | B62D 33/04 296/182.1 |
| 9,815,501 | B2 * | 11/2017 | McCormack | B62D 33/04 |
| 2004/0232728 | A1 * | 11/2004 | Smidler | B62D 33/04 296/186.1 |
| 2007/0284913 | A1 * | 12/2007 | Ehrlich | B62D 33/046 296/186.1 |
| 2009/0230727 | A1 * | 9/2009 | Ehrlich | B62D 33/046 296/185.1 |
| 2013/0207415 | A1 * | 8/2013 | Wylezinski | B62D 27/026 296/185.1 |
| 2016/0107706 | A1 * | 4/2016 | McCormack | B62D 33/04 362/485 |
| 2018/0001940 | A1 * | 1/2018 | Zehner | B62D 25/06 |

* cited by examiner

*Primary Examiner* — Lori L Lyjak
(74) *Attorney, Agent, or Firm* — Procopio, Cory, Hargreaves & Savitch LLP

(57) ABSTRACT

Two-piece rail assemblies for truck trailers are provided. The two piece rail assemblies may include: a first rail configured with a first straight edge, and a second rail configured with a second straight edge coupled to the first straight edge of the first rail and configured with a curved edge to receive a cambered roof panel.

20 Claims, 7 Drawing Sheets

FIG. 2A   FIG. 2B

RAIL ASSEMBLIES FOR TRAILERS

CROSS-REFERENCE TO RELATED APPLICATIONS

This application claims the benefit of priority under 35 U.S.C. § 119(e) of U.S. Provisional Patent Application No. 62/357,801, filed Jul. 1, 2016, entitled "Rail Assemblies for Trailers." The disclosure of the above-referenced application is incorporated herein by reference.

BACKGROUND

Field of the Invention

The present invention relates to truck trailers, and more specifically, to top rail assemblies for truck trailers.

Background

A truck trailer, commonly referred to as a semitrailer, is a vehicle that often operates as a part of a domestic or international transport infrastructure. An important area of the truck trailers is the top rail assemblies that couple to a roof panel. Different types of top trail assemblies for truck trailers are used to receive a roof panel. Top rail assemblies for truck trailers are typically made of a single piece rail that is attached to the roof panel.

SUMMARY

The present disclosure describes top rail assemblies for trailers.

In an embodiment, two piece top rail assemblies for truck trailers are disclosed. The two piece top rail assemblies may include a first rail configured with a first straight edge; and a second rail configured with a second straight edge coupled to the first straight edge of the first rail and configured with a curved edge to receive a cambered roof panel. The top rail assemblies may include a feature that a height at a middle of the second rail is higher than a height at the each end of the second rail.

In another embodiment, two piece rear frame headers for trailers are disclosed. The rear frame headers may include a bottom piece configured with an L-shaped cross section including a vertical portion and a horizontal portion; and a top curved piece coupled to the vertical portion of the bottom piece, the top curved piece configured to accept and be attached to a cambered roof panel. The rear frame header may include a box shaped portion extending from a rear edge of the horizontal portion along a length of the bottom portion.

In another embodiment, roof assemblies are disclosed. The roof assemblies may include a cambered roof panel; a top rail assembly and a rear frame header. The top rail assembly may include a first rail configured with a first straight edge; and a second rail configured with a second straight edge coupled to the first straight edge of the first rail and configured with a curved edge coupled to a front of the cambered roof panel. The rear frame header may include a bottom piece configured with an L-shaped cross section including a vertical portion and a horizontal portion; and a top curved piece coupled to the vertical portion of the bottom piece, the top curved piece coupled to a rear of the cambered roof panel.

Other features and advantages of the present disclosure should be apparent from the present description which illustrates, by way of example, aspects of the invention.

BRIEF DESCRIPTION OF THE DRAWINGS

The details of the present disclosure, both as to its structure and operation, may be gleaned in part by study of the appended further drawings, in which like reference numerals refer to like parts, and in which:

FIG. 2A is a cutaway side view of the two piece top rail assembly of FIGS. 1A and 1B at a first cutaway point;

FIG. 2B is a cutaway side view of the two piece top rail assembly of FIGS. 1A and 1B at a second cutaway point;

DETAILED DESCRIPTION

As stated above, top rail assemblies for truck trailers are typically made of a single piece rail. Specifically, the top of the rail is flat. However, the flat design of the top rail does not interface well with a cambered roof panel ('cambered' referred to as 'curved'). Thus, a flat design of the top of the rail can leave a gap between the top rail and the cambered roof panel. The disadvantage of leaving the gap between the top rail and the cambered roof panel is that contaminants, such as snow or rain, may not be removed once they are in the gap. Thus, several embodiments of rail assemblies are proposed herein for the rail assemblies to readily accept the cambered roof panel. In one embodiment, a rail assembly includes a first rail configured as a straight piece with a flat edge and a second rail configured with a flat edge, coupled to the flat edge of the first rail, and configured with a curved top edge. Accordingly, the second rail is configured to conform to the cambered roof panel. The application of the curved edge reduces the chance of contaminants in the gap between the curved second rail and the cambered roof panel. Moreover, two-piece rail assemblies can provide more support to the roof panel than when the roof panel is reinforced with a single-piece rail assembly.

After reading this description, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present invention.

Figure 1A:
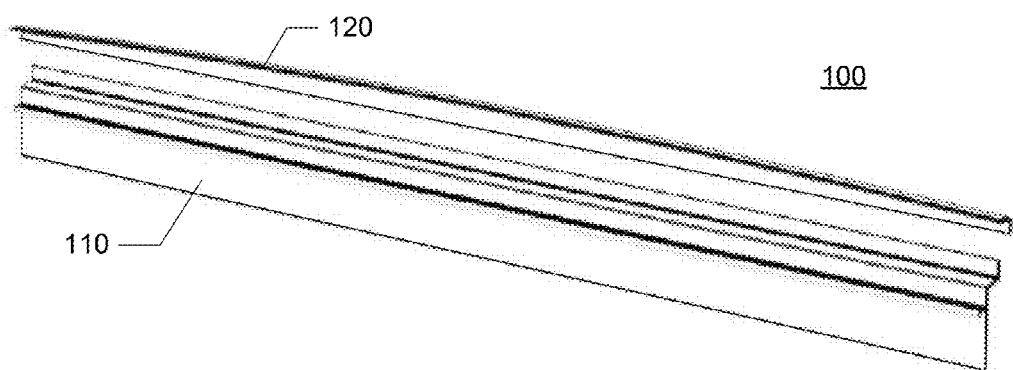
FIG. 1A is a perspective view of a two piece top rail assembly in accordance with an embodiment of the present disclosure.

FIG. 1A is a perspective view of a two piece top rail assembly 100 in accordance with an embodiment of the present disclosure. In the illustrated embodiment of FIG. 1A, the two piece top rail assembly 100 includes a bottom rail 110 and a top rail 120. As shown in FIG. 1A, the bottom rail 110 is configured as a straight piece; and the second top rail 120 is configured with a flat edge to couple to the bottom rail 110 and configured with a curved top edge to receive a cambered roof panel. A molding process for forming the curved top rail 120 may require more steps than a molding process for forming a straight piece. A molding process may include extruding the top rail 120 and the bottom rail 110. Once the top rail 120 and the bottom rail 110 are extruded, the top rail 120 and the bottom rail 110 are joined to form the two piece top rail assembly 100. Extruding the curved top rail 120 further requires curving the top rail 120. The bottom rail 110 and the top rail 120 may be attached by adhesive only, mechanical fasteners only, or a combination of adhesive and mechanical fasteners.

Figure 1B:
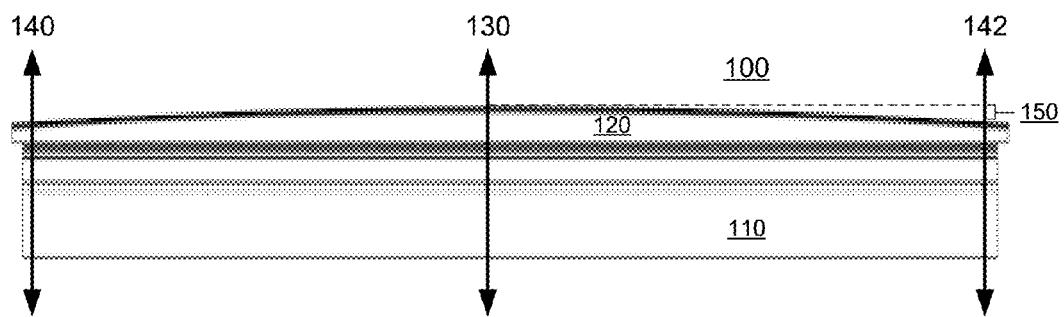
FIG. 1B is a front view of the two piece top rail assembly of FIG. 1A in accordance with an embodiment of the present disclosure.

FIG. 1B is a front view of the two piece top rail assembly 100 of FIG. 1A in accordance with an embodiment of the present disclosure. In the illustrated embodiment of FIG. 1B, the bottom and top rails 110 and 120 of the top rail assembly 100 are shown coupled together. The curved top rail 120 is shaped to be progressively increasing in height from the edges (see cutaway lines 140 and 142) to the middle (see cutaway line 130) of the top rail 120 in order to receive the cambered roof panel. Accordingly, the curved top rail 120 is configured to conform to the cambered roof panel. The difference in height from the edges to the middle of the top rail 120 is depicted in FIG. 1B by a distance 150. In one embodiment, the bottom rail 110 and the top rail 120 are made of extrusions. In one embodiment, the extrusions are made of aluminum. In this disclosure, the term "aluminum" is intended to mean both aluminum and aluminum alloys.

As mentioned above, the curved top rail 120 is configured to conform and readily accept the cambered roof panel. When the cambered roof panel is coupled to the top of the curved top rail 120, the combined roof panel and rail assembly fits well without leaving any gap. Accordingly, the roundness of the top rail 120 is configured to conform to the cambered roof panel.

The curved top rail 120 and the cambered roof panel may be attached by adhesive. If a straight piece is used as the top rail, an additional process to press the top rail is required in order to fill the gap between the straight top rail and the cambered roof panel.

FIG. 2A is a cutaway side view 200 of the two piece top rail assembly 100 of FIGS. 1A and 1B at a first cutaway point 130 as shown in FIG. 1B in the middle of the top rail assembly 100. Since the cutaway point 130 is at the middle of the curved top rail 120, the height 240 of the top rail 120 is at the highest.

FIG. 2B is a cutaway side view 210 of the two piece top rail assembly 100 of FIGS. 1A and 1B at a second cutaway point that can be either cutaway point 140 or 142 as shown in FIG. 1B at the edges of the top rail assemble 100. Since the cutaway points 140 and 142 are at the end of the curved top rail 120, the height 242 of the second piece 220 is at the lowest.

Accordingly, the height 240 at the middle of the curved top rail 120 is always higher than the height 242 at each end of the top rail 120. A difference in height 244 between the two heights 240 and 242 is equivalent to the height difference 150 shown in FIG. 1B. This height difference 244 accounts for the curved portion of the top rail 120 shown in FIG. 1A and FIG. 1B. As described above, the curved portion of the top rail 120 provides the tight fit for a portion of cambered roof panel 230 because the curved top rail 120 is configured to conform to the cambered roof panel 230.

Figure 2C:
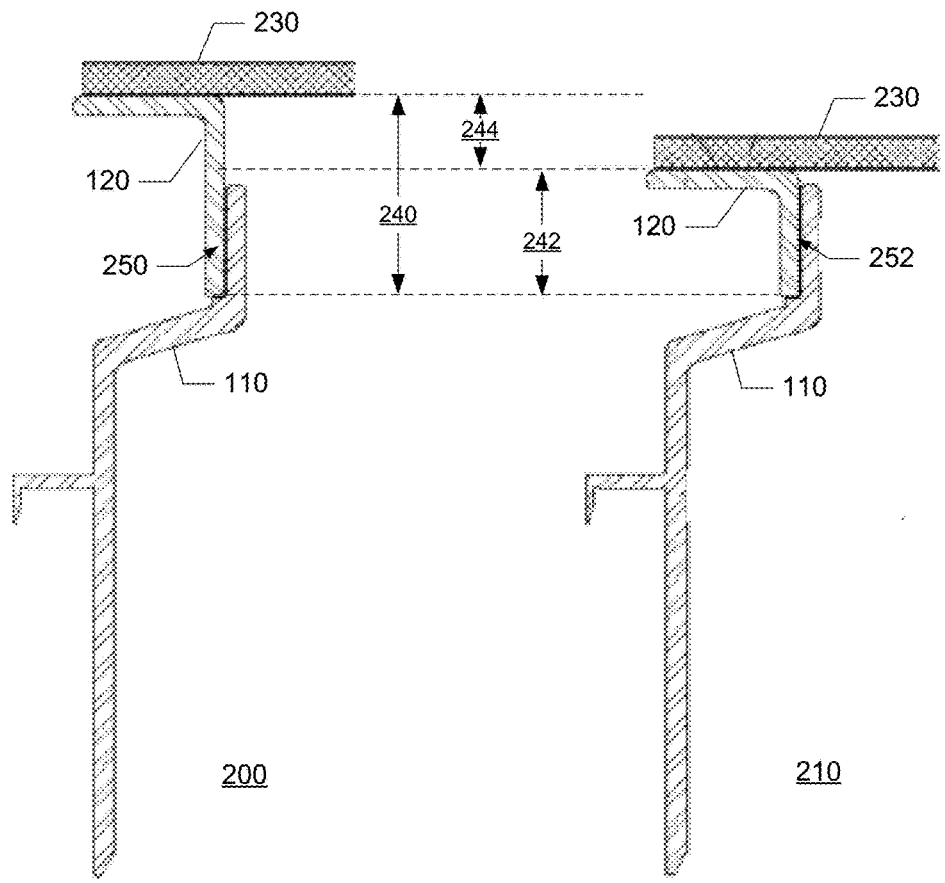
FIG. 2C is a cutaway side view of the two piece top rail assembly of FIGS. 1A and 1B including a fastener securing the two pieces in accordance with an embodiment of the present disclosure.
Figure 2C:
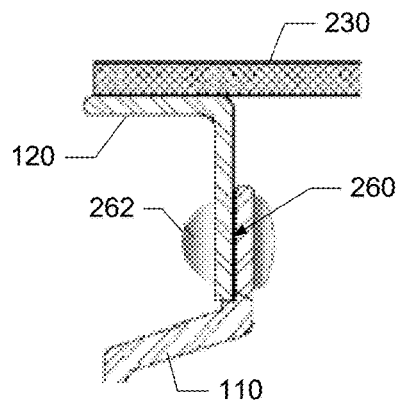

The bottom rail 110 is configured to be attached to the top of a front wall of a trailer and the top rail 120 is configured to attach to a bottom surface of the cambered roof panel. Further, the bottom rail 110 includes features used to attach the curved top rail 120. For example, the bottom rail 110 and the curved top rail 120 are attached at points 250, 252 using, for example, an adhesive. In other examples, the bottom rail 110 and the curved top rail 220 are attached using mechanical fasteners. In other examples, the rails 210, 220 can be attached using any combination of adhesive, mechanical fastener, or other attachment means and methods including welding, for example. FIG. 2C is a cutaway side view of the two piece top rail assembly 100 of FIGS. 1A and 1B including a fastener 262 securing the bottom rail 110 and the top rail 120 (e.g., at the points 250 and 252 of FIGS. 2A and 2B, respectively) in accordance with one embodiment of the present disclosure. In the example of FIG. 2C, an adhesive 260 is also used to secure the bottom rail 110 and the top rail 120 (e.g., at the points 250 and 252 of FIGS. 2A and 2B, respectively).

Figure 3A:
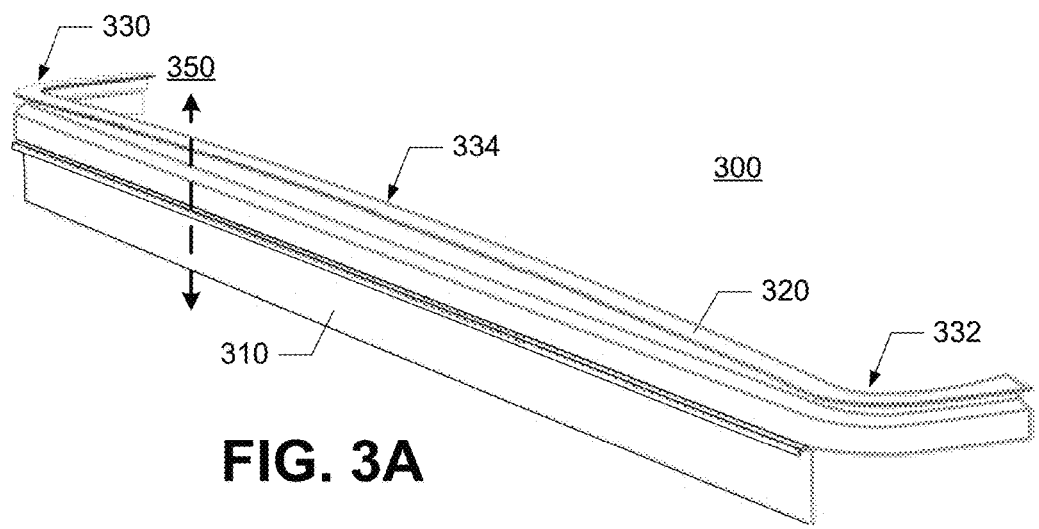
FIG. 3A is a perspective view of a two piece top rail assembly in accordance with another embodiment of the present disclosure.

FIG. 3A is a perspective view of a two piece top rail assembly 300 in accordance with another embodiment of the present disclosure. The two piece top rail assembly 300 includes a bottom rail 310 and a top rail 320. The two piece top rail assembly 300 can provide more support for the cambered roof panel (see 230 in FIGS. 2A and 2B) than single piece top rail assemblies.

In the illustrated embodiment of FIG. 3A, the bottom rail 310 is configured as a straight piece that may be made using a one piece extrusion process. Further, the bottom rail 310 may be attached to the top of the front wall of a trailer. The bottom rail 310 also includes features used to attach to the top rail 320 at the top of the bottom rail 310. The bottom rail 310 may be attached to the top rail 320 by adhesive (e.g., 260 in FIG. 2C) and/or mechanical fasteners (e.g., 262 in FIG. 2C). The top rail 320 may be attached to a bottom surface of the cambered roof panel using adhesive and/or mechanical fasteners.

In the illustrated embodiment of FIG. 3A, the top rail 320 is configured with a curved top surface and may be made with molded plastic. As stated above, a molding process for a curved piece may require more steps than a molding process for a straight piece. The molding process may include extruding the top rail 320 and the bottom rail 310. Once the top rail 320 and the bottom rail 310 are extruded, the top rail 320 and the bottom rail 310 may be joined to form the two piece top rail assembly 300. Extruding the curved top rail 320 requires curving. The top rail 320, in this example, also includes rounded end corners 330 and 332, as well as features 334 to attach the cambered roof panel (e.g., 230 in FIG. 2A, 2B). The rounded end corners 330, 332 extend down a length of the sides of the trailer where the top rail 320 can be coupled to the tops of the side walls of the trailer.

Figure 3B:
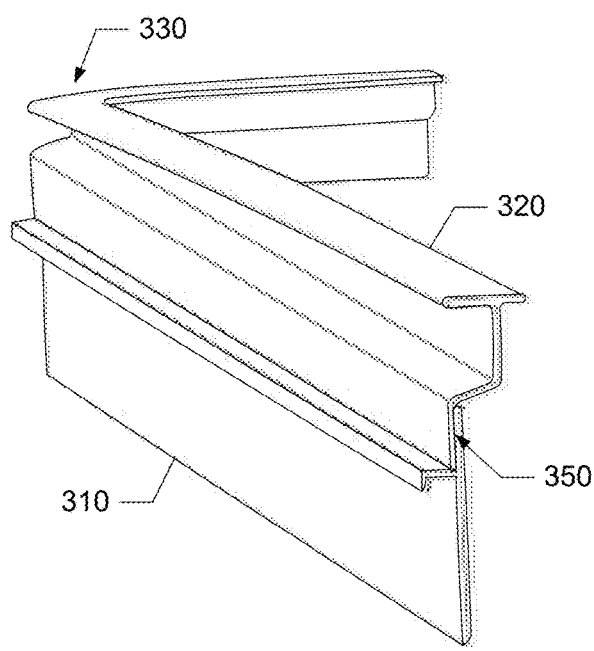
FIG. 3B is a detailed view of a rounded end corner of the two piece top rail assembly of FIG. 3A in accordance with the another embodiment of the present disclosure.

FIG. 3B is a detailed cutaway perspective view of the rounded end corner 330 of the two piece top rail assembly 300 of FIG. 3A in accordance with an embodiment of the present disclosure. The illustrated embodiment of FIG. 3B shows the view of the two piece top rail assembly 300 of FIG. 3A cut along the line 350. The top rail 320 is configured with a curved top edge in order to conform to the cambered roof panel. Further, the bottom rail 310 includes features used to attach the curved top rail 320. For example, the bottom rail 310 and the curved top rail 320 are attached at point 350 using, for example, an adhesive. In other examples, the bottom rail 310 and the curved top rail 320 are attached using mechanical fasteners. In other examples, the rails 310, 320 can be attached using any combination of adhesive, mechanical fastener, or other attachment means and methods including welding, for example.

Figure 4A:
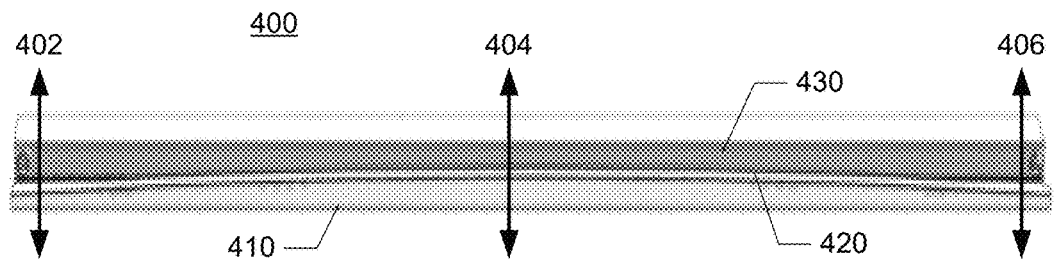
FIG. 4A is a back view of a two piece rear frame header attached to a cambered roof panel in accordance with an embodiment of the present disclosure.

FIG. 4A is a rear view of a two piece rear frame header 400 attached to a cambered roof panel in accordance with an embodiment of the present disclosure. The rear frame header 400 is an assembly coupled to the top of the rear of a trailer and is attached to a cambered roof panel 430. In the illustrated embodiment of FIG. 4A, the rear frame header 400 includes a bottom piece 410 and a top piece 420 that may be attached together using any combination of adhesive, mechanical fasteners, and other attachment means and methods including welding. The rear frame header assembly 400 may be attached to a bottom surface of the cambered roof panel 430 using any combination of adhesive, mechanical fasteners, and other attachment means and methods including welding.

Figure 4B:
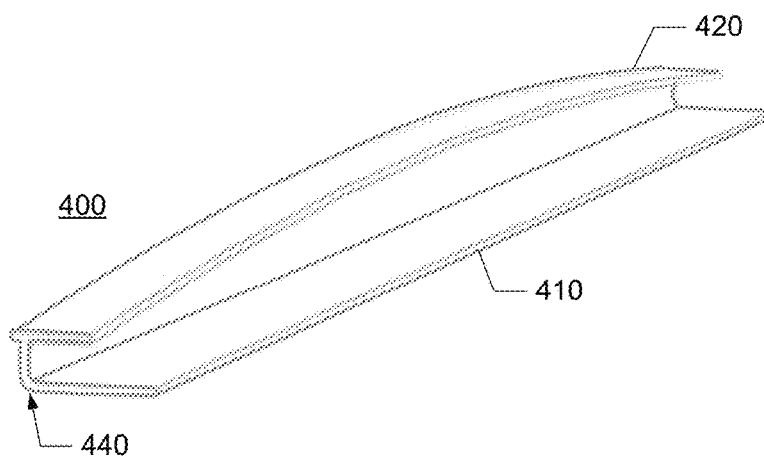
FIG. 4B is a perspective view of the two piece rear frame header of FIG. 4A including a bottom piece and a top piece.

FIG. 4B is a perspective view of the two piece rear frame header 400 of FIG. 4A including the bottom piece 410 and the top piece 420 when not attached to the cambered roof panel 430. The bottom piece 410 is an L-shaped piece bent at point 440. The L-shape of the bottom piece 410 includes a substantially vertical portion and a substantially horizontal portion. The top piece 420 is configured as a curved piece. In accordance with one embodiment, the top surface of the top piece 420 is configured to couple to a bottom surface of the cambered roof panel 430.

Figure 4C:
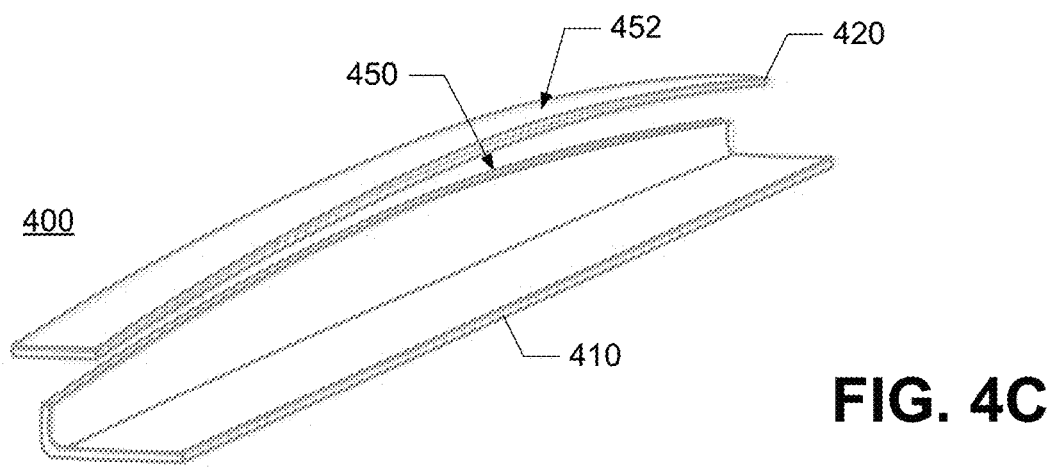
FIG. 4C is an exploded perspective view of the two piece rear frame header of FIGS. 4A and 4B including the bottom piece and the top piece in accordance with an embodiment of the present disclosure.

FIG. 4C is an exploded perspective view of the two piece rear frame header 400 of FIGS. 4A and 4B including the bottom piece 410 and the top piece 420 in accordance with an embodiment of the present disclosure. In the illustrated embodiment of FIG. 4C, the top piece 420 is configured with a curvature 452 to readily accept and attach to the cambered roof panel 430 (see FIG. 4A). Accordingly, the curved top piece 420 is configured to conform to the cambered roof panel 430. In the example two piece rear frame header 400 of FIG. 4C, a top edge of the vertical portion of the bottom piece 410 may be shaped into a curved top 450 to accommodate and couple to the curvature 452 of the top piece 420.

Figure 4D:
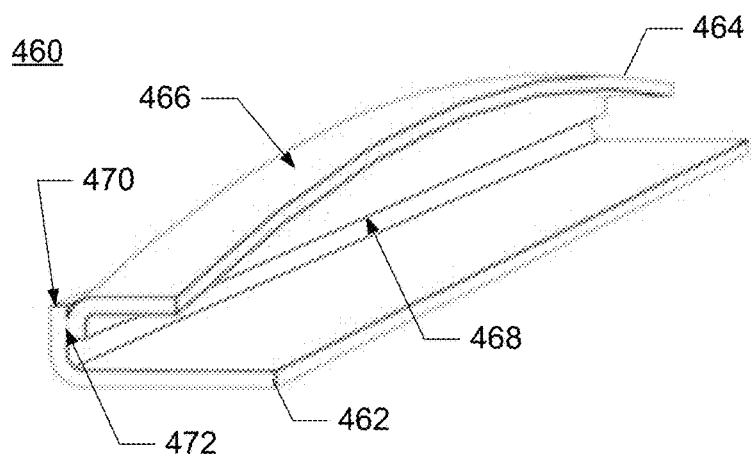
FIG. 4D is an exploded perspective view of the two piece rear frame head of FIGS. 4A and 4B including the bottom piece and top piece in accordance with another embodiment of the present disclosure.

FIG. 4D is an exploded perspective view of the two piece rear frame header 460 of FIGS. 4A and 4B including the bottom piece 462 and the top piece 464 in accordance with another embodiment of the present disclosure. In the illustrated embodiment of FIG. 4D, the top piece 464 is configured with a curvature 466 to readily accept and attach to the cambered roof panel 430 (see FIG. 4A). In the example two piece rear frame header 460 of FIG. 4D, the top piece 464 also includes a vertical portion 468 with a straight surface which is configured to couple to the bottom piece 462. The bottom piece 462 also includes a vertical portion 470 with a straight surface to attach (at point 472) to the vertical portion 468 of the top piece 464. Therefore, the top piece 464 overlaps the bottom piece 462 as shown in FIG. 4D.

Figure 4E:
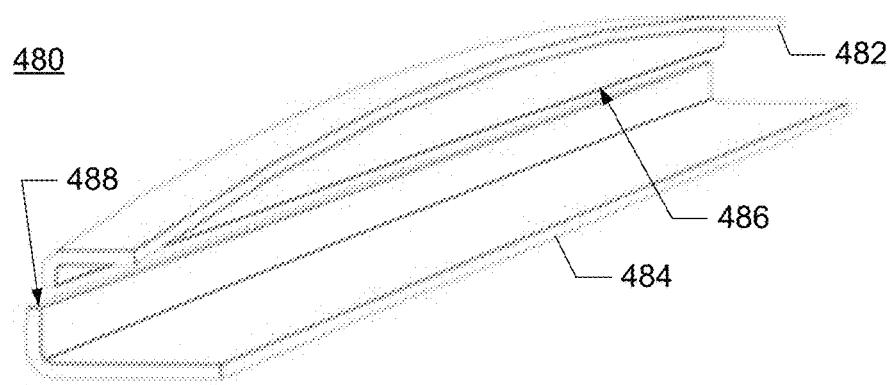
FIG. 4E is a slight variation of the two piece rear frame header of FIG. 4D.

FIG. 4E is a slight variation 480 of the two piece rear frame header 460 of FIG. 4D. In the illustrated embodiment of FIG. 4E, the straight surface 486 of the vertical portion of the top piece 482 couples directly to the straight surface 488 of the vertical portion of the bottom piece 484.

Figure 5A:
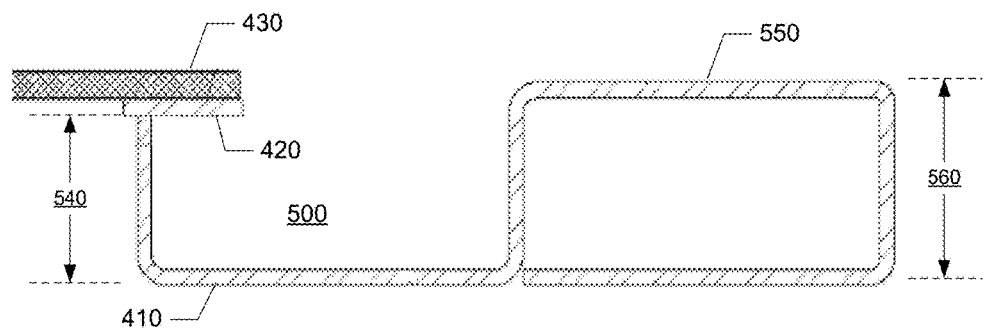
FIG. 5A is a cutaway side view of the two piece rear frame header of FIGS. 4A, 4B and 4C at a first cutaway point shown in FIG. 4A.

FIG. 5A is a cutaway side view 500 of the two piece rear frame header 400 of FIGS. 4A, 4B and 4C at a first cutaway point 404 shown in FIG. 4A. The cutaway side view 500 shows cross sections of the bottom piece 410 and the top piece 420. The bottom piece 410 is configured with a vertical portion, a horizontal portion and a trailing box shaped portion 550 that was omitted from FIGS. 4A, 4B and 4C. The top piece 420 is configured as a curved piece. The trailing box shaped portion 550 was omitted from FIGS. 4A, 4B and 4C in order to allow viewing of the other details of the bottom piece 410 and the top piece 420. The box shaped portion 550 adds structural rigidity to the two piece rear frame header 400. Since the cutaway point 404 is at the middle of the rounded top 450 (see FIG. 4A) of the bottom piece 410, a height 540 of the vertical portion of the bottom piece 410 is at its highest.

Figure 5B:
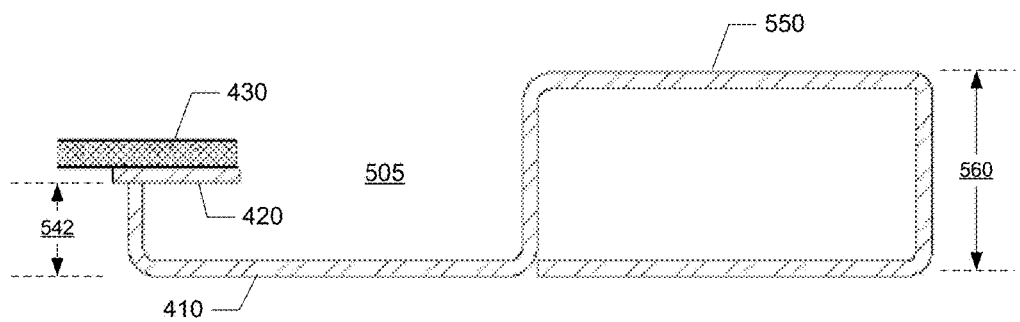
FIG. 5B is a cutaway side view of the rear frame header of FIGS. 4A, 4B and 4C at a second cutaway point shown in FIG. 4A.

FIG. 5B is a cutaway side view 505 of the rear frame header 400 of FIGS. 4A, 4B and 4C at a second cutaway point that can be either of cutaway points 402 or 406 shown in FIG. 4A. Since the cutaway points 402 and 406 are at the ends of the bottom piece 410, a height 542 of the vertical portion of the bottom piece 410 is at its lowest. Thus, the height 540 at the middle of the bottom piece 410 is always higher than the height 542 at the end of the bottom piece 410.

The difference between the two heights 540 and 542 accounts for the curvature 452 (see FIG. 4C) of the top piece 420 shown in FIG. 4C. The curved piece 420 is configured to conform to the cambered roof panel 430 and, in this embodiment, to conform to the curved top 450 of the bottom piece 410. Accordingly, the curvature 452 of the top piece 420 provides a tight fit for the cambered roof panel 430.

As illustrated in the side views 500 and 505, the example trailing box shaped portion 550 is configured with a constant height 560 across its entire length. Other embodiments of trailing box shaped portions may be configured with various heights along the length of the bottom piece 410.

Figure 6A:
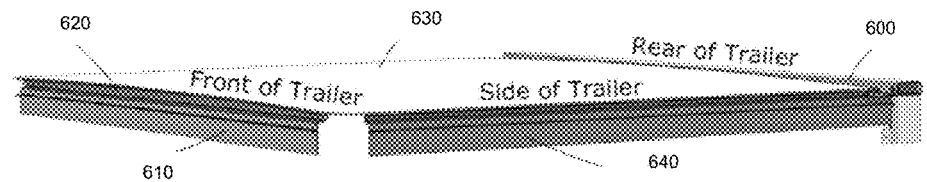
FIG. 6A is a full view of a roof assembly including a two-piece front top rail assembly and a two piece rear frame header that are positioned with a cambered sandwich composite roof panel.

FIG. 6A is a full view of a roof assembly including a two-piece front top rail assembly and a two piece rear frame header that are positioned with and coupled to a cambered sandwich composite roof panel 630. A front of the cambered sandwich composite roof panel 630 is coupled to a two piece top rail assembly including a bottom rail 610 and a top rail 620. The top rail 620 conforms to the camber of the composite roof panel 630 by being configured in a manner similar to the top rail 120 of the two piece top rail assembly 100 of FIGS. 1A and 1B. The bottom rail 610 could be configured similarly to the bottom rail 110 of the two piece top rail assembly 100 of FIGS. 1A and 1B. Although not shown, the front two piece top rail assembly of FIG. 6A could be configured similarly to the two piece top rail assembly 300 of FIGS. 3A and 3B.

Sides of the cambered sandwich composite roof panel 630 are coupled to two side top rails 640 of which only one is shown in FIG. 6A. The side edges of the cambered sandwich composite roof panel 630 can be straight such that the side top rails 640 need not include curved top portions.

A rear portion the cambered sandwich composite roof panel 630 is coupled to a two piece rear frame header 600. The two piece rear frame header 600 could be configured similarly to the two piece rear frame header 400 of FIGS. 4A, 4B and 4C.

Figure 6B:
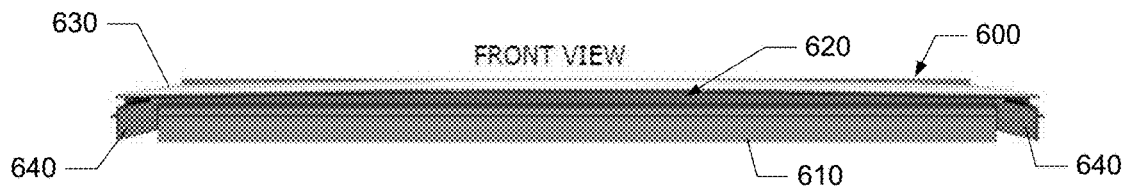
FIG. 6B is a front view of the roof assembly of FIG. 6A showing a bottom rail, a top rail, side top rails, each coupled with the cambered sandwich composite roof panel.

FIG. 6B is a front view of the roof assembly of FIG. 6A showing the bottom rail 610, the top rail 620, and the side top rails 640, each coupled with the cambered sandwich composite roof panel 630.

Figure 6C:
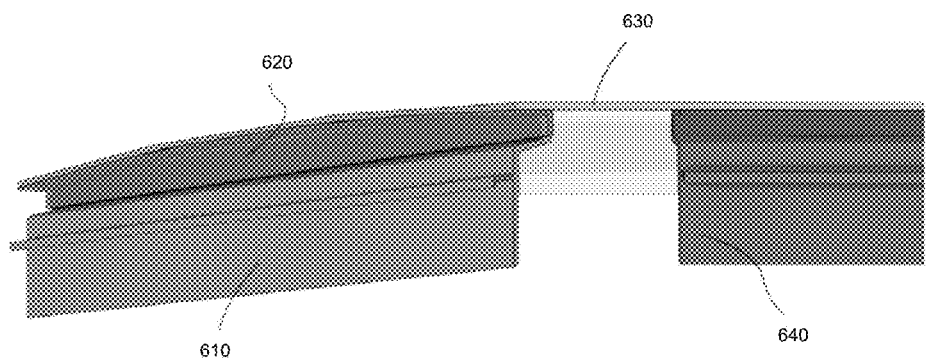
FIG. 6C is a perspective view of the roof assembly of FIG. 6A showing the bottom rail, the top rail, and one of the side top rails, each coupled with the cambered sandwich composite roof panel.

FIG. 6C is a perspective view of the roof assembly of FIG. 6A showing the bottom rail 610, the top rail 620, and one of the side top rails 640, each coupled with the cambered sandwich composite roof panel 630.

The descriptions of the disclosed embodiments are provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description presented herein represent embodiments representative of the subject matter which is broadly contemplated by the present disclosure.

Examples of embodiments are shown on the following pages. All features of each example are not necessarily required in a particular embodiment. Other solutions can also be used (off the shelf or custom made). Suggestions for requirements refer to a particular embodiment and not necessarily all embodiments.

Additional variations and embodiments are also possible. Accordingly, the technology is not limited only to the specific examples noted herein.

The invention claimed is:

1. A top rail assembly for a trailer, comprising:
a first rail configured with a first straight edge; and
a second rail configured with a second straight edge coupled to the first straight edge of the first rail and configured with a curved edge to receive a cambered roof panel.

2. The top rail assembly of claim 1, wherein the curved edge of the second rail conforms to the cambered roof panel.

3. The top rail assembly of claim 1, wherein a height of the second rail is progressively increasing from first and second ends of the second rail to a middle of the second rail.

4. The top rail assembly of claim 1, wherein the second rail is configured with a first rounded end corner that extends down a first side of the cambered roof panel and a second rounded end corner that extends down a second side of the cambered roof panel.

5. The top rail assembly of claim 1, wherein the curved edge of the second rail is configured to couple to a bottom surface of the cambered roof panel.

6. The top rail assembly of claim 1, wherein the first rail and the second rail are made of aluminum.

7. The top rail assembly of claim 1, wherein the first rail is attached to the second rail by adhesive, and the second rail is attached to the cambered roof panel by adhesive.

8. A rear frame header assembly for a trailer, comprising:
a bottom piece configured with an L-shaped cross section including a vertical portion and a horizontal portion; and
a top curved piece coupled to the vertical portion of the bottom piece, the top curved piece configured to accept and be attached to a cambered roof panel.

9. The rear frame header assembly of claim 8, wherein a top edge of the vertical portion of the bottom piece is curved to conform to the top curved piece.

10. The rear frame header assembly of claim 8, wherein the top curved piece is configured to couple to a bottom surface of the cambered roof panel.

11. The rear frame header assembly of claim 8, wherein the bottom piece further comprises a box shaped portion extending from a rear edge of the horizontal portion along a length of the bottom portion.

12. The rear frame header assembly of claim 11, wherein a cross section of the box shaped portion comprises a constant shape along an entire length of the box shaped portion.

13. The rear frame header assembly of claim 11, wherein cross sections of the box shaped portion are configured with various heights along the length of the box shaped portion.

14. The rear frame header assembly of claim 8, wherein the bottom piece is attached to the top piece by adhesive, and the top piece is attached to the cambered roof panel by adhesive.

15. A roof assembly for a trailer, comprising:
a cambered roof panel;
a top rail assembly comprising:
a first rail configured with a first straight edge, and
a second rail configured with a second straight edge to couple to the first straight edge of the first rail and configured with a curved edge coupled to a front of the cambered roof panel; and
a rear frame header comprising:
a bottom piece configured with an L-shaped cross section including a vertical portion and a horizontal portion, and
a top curved piece coupled to the vertical portion of the bottom piece, the top curved piece coupled to a rear of the cambered roof panel.

16. The roof assembly of claim 15, wherein the second rail is configured with a first rounded end corner that extends down a first side of the cambered roof panel and a second rounded end corner that extends down a second side of the cambered roof panel.

17. The roof assembly of claim 15, wherein the curved edge of the second rail is configured to couple to a bottom surface of the cambered roof panel.

18. The roof assembly of claim 15, wherein the first rail is attached to the second rail by adhesive, the second rail is attached to the cambered roof panel by adhesive, the bottom piece is attached to the top piece by adhesive, and the top piece is attached to the cambered roof panel by adhesive.

19. The roof assembly of claim 15, wherein the bottom piece further comprises a box shaped portion extending from a rear edge of the horizontal portion along a length of the bottom portion.

20. The roof assembly of claim 19, wherein a cross section of the box shaped portion comprises a constant shape along an entire length of the box shaped portion.

* * * * *